(12) United States Patent
Ottersbach et al.

(10) Patent No.: US 12,000,509 B2
(45) Date of Patent: Jun. 4, 2024

(54) CHANNEL CLIP FOR GUIDE CHANNELS OF ENERGY GUIDE CHAINS

(71) Applicant: IGUS GMBH, Cologne (DE)

(72) Inventors: Joerg Ottersbach, Bornheim (DE); Georg Theiss, Cologne (DE)

(73) Assignee: IGUS GMBH, Cologne (DE)

( * ) Notice: Subject to any disclaimer, the term of this patent is extended or adjusted under 35 U.S.C. 154(b) by 251 days.

(21) Appl. No.: 17/309,073

(22) PCT Filed: Oct. 1, 2019

(86) PCT No.: PCT/EP2019/076632
§ 371 (c)(1),
(2) Date: Nov. 15, 2021

(87) PCT Pub. No.: WO2020/083621
PCT Pub. Date: Apr. 30, 2020

(65) Prior Publication Data
US 2022/0090706 A1 Mar. 24, 2022

(30) Foreign Application Priority Data
Oct. 22, 2018 (DE) ..................... 20 2018 106 037.6

(51) Int. Cl.
*F16L 3/233* (2006.01)
*F16L 3/24* (2006.01)
*F16G 13/16* (2006.01)

(52) U.S. Cl.
CPC ............. *F16L 3/233* (2013.01); *F16L 3/2332* (2013.01); *F16L 3/243* (2019.08); *F16G 13/16* (2013.01)

(58) Field of Classification Search
CPC ......... F16L 3/233; F16L 3/243; F16L 3/2332; F16G 13/16; H02G 3/32
See application file for complete search history.

(56) References Cited

U.S. PATENT DOCUMENTS 2,417,261 A * 3/1947 Morehouse ........... F16L 3/1233
248/316.1
3,515,363 A 6/1970 Fisher
(Continued)

FOREIGN PATENT DOCUMENTS

CN 1516786 7/2004
CN 101346566 1/2009
(Continued)

OTHER PUBLICATIONS

International Search Report from corresponding PCT Appln. No. PCT/EP2019/076632 dated Jan. 7, 2020.
(Continued)

*Primary Examiner* — Eret C McNichols
(74) *Attorney, Agent, or Firm* — Grossman, Tucker, Perreault & Pfleger, PLLC (57) ABSTRACT

A channel clip for fixing conductors to the outside of guide channels of power conduction chains. The aim of the invention is to be able to fix the conductors to the outer sides of guide channels with little effort by means of such a channel clip. This aim is achieved in that the channel clip substantially comprises a U-shaped bracket of resilient plastic material having a first U limb and a second U limb, in that the two U limbs form a receiving region for the conductors to be held, in that a transverse web is provided on the upper end of the first U limb and extends in the direction toward the upper end of the second U limb, in that, to close the receiving region at the free end of the transverse web and at the adjacent upper end of the second U limb, a snap-in connection that can be latched in is provided, and in that the first limb, provided with the transverse web, has a device for mounting the channel clip on a guide channel.

23 Claims, 5 Drawing Sheets

(56) References Cited

U.S. PATENT DOCUMENTS

| | | | | |
|---|---|---|---|---|
| 3,637,177 | A | * | 1/1972 | Santucci .................. F16L 3/12 248/74.3 |
| 4,439,896 | A | * | 4/1984 | Matsui .................. F16L 3/233 24/16 PB |
| 4,609,171 | A | * | 9/1986 | Matsui .................. H02G 3/32 248/316.1 |
| 5,230,489 | A | * | 7/1993 | White .................. F16L 3/233 248/74.2 |
| 6,216,320 | B1 | | 4/2001 | Schauermann |
| 6,513,766 | B1 | * | 2/2003 | Gretz .................. F16L 3/133 248/62 |
| 6,517,032 | B1 | * | 2/2003 | Gretz .................. F16L 3/23 248/62 |
| 6,655,644 | B1 | * | 12/2003 | Gretz .................. F16L 3/233 248/69 |
| 6,978,973 | B1 | | 12/2005 | Gretz |
| 7,071,418 | B2 | * | 7/2006 | Brockman .............. H02G 3/32 174/157 |
| 8,573,881 | B2 | * | 11/2013 | Spitz .................. F16B 2/243 24/295 |
| 8,827,214 | B2 | | 9/2014 | Ogawa |
| 10,088,097 | B2 | | 10/2018 | Hermey |
| 10,361,544 | B2 | * | 7/2019 | Schulte .................. H02G 3/32 |
| 10,622,793 | B2 | | 4/2020 | Strack |
| 10,797,477 | B1 | * | 10/2020 | Peterson .................. H02G 3/32 |
| 10,847,960 | B1 | * | 11/2020 | Naugler .................. F16B 2/22 |
| 2009/0266945 | A1 | | 10/2009 | Dietrich et al. |
| 2010/0043384 | A1 | | 2/2010 | Kempter |
| 2019/0360555 | A1 | | 11/2019 | Hermey et al. |
| 2022/0090734 | A1 | * | 3/2022 | Atakan .................. F16B 2/243 |

FOREIGN PATENT DOCUMENTS

| | | |
|---|---|---|
| CN | 102770670 | 11/2012 |
| CN | 110446881 | 11/2019 |
| DE | 1192879 | 5/1965 |
| DE | 9405363 | 9/1994 |
| DE | 19840959 | 4/2000 |
| DE | 10021141 | 1/2001 |
| DE | 102006026250 | 12/2007 |
| DE | 202011100313 | 2/2012 |
| DE | 202015101341 | 5/2015 |
| GB | 971426 | 9/1964 |
| GB | 2202270 | 9/1988 |
| WO | 8300272 | 1/1983 |
| WO | 03001069 | 1/2003 |
| WO | 2006113870 | 10/2006 |

OTHER PUBLICATIONS

International Preliminary Report on Patentability from corresponding PCT Appln. No. PCT/EP2019/076632, dated Apr. 27, 2021.
Search Report from related Chinese Appln. No. 201980076770.5 dated Apr. 20, 2022. 2 pages.

* cited by examiner

CHANNEL CLIP FOR GUIDE CHANNELS OF ENERGY GUIDE CHAINS

FIELD

The invention concerns a channel clip for fixing lines externally to guide channels of energy guide chains.

BACKGROUND

There is frequently a wish or a need to fix lines externally to the guide channels of energy guide chains, wherein those lines are laid in stationary relationship and do not also participate in the movements of the energy guide chains.

SUMMARY

The object of the invention is to provide a channel clip with which lines can be stationarily fixed to the outsides of guide channels with a low degree of complication and effort.

According to the invention that object is attained in that the channel clip substantially comprises a U-shaped bracket of elastic plastic material having a first U-limb and a second U-limb, the two U-limbs face upwardly and form a receiving region for the lines to be held, that provided at the upper end of the first U-limb is a transverse web extending in the direction towards the upper end of the second U-limb, a latchable snap connection for closing the receiving region is provided at the free end of the transverse web and at the adjoining upper end of the second U-limb, and the first limb provided with the transverse web has a device for holding the channel clip to the guide channel. The channel clip according to the invention makes it possible to lay stationary lines externally to the guide channels of energy guide chains and also to release them again without any problem.

The snap connection which serves for easy closing and opening preferably comprises two noses which engage over each other and elastically latch one behind the other.

In that case the nose provided on the transverse web can be directed upwardly while the nose on the second U-limb faces downwardly and latches over the nose provided on the transverse web.

To facilitate latching engagement of the two noses a lip can be arranged below the nose on the second U-limb, the lip engaging under the transverse web upon latching engagement of the snap connection. In that case at the same time the snap connection is additionally secured in its latched position.

The two U-limbs can be arranged in parallel relationship as from manufacture, wherein the second limb is elastically bent open for opening the clip and for inserting or removing the lines.

Alternatively the second U-limb as of manufacture towards its upper end can also be directed away from the first U-limb, in which case it has to be elastically bent in the direction of the transverse limb until the snap connection comes into latching engagement, to close the clip.

So that the channel clip acquires sufficient stability and the lines are properly held therein the U-shaped bracket can be in the form of a wide band, in the receiving region of which the lines can be reliably and securely mounted.

The snap connection comprising the two holding noses which latch one behind the other desirably extends over the entire width of the band.

One of the two holding noses of the snap connection preferably has a recess or opening in its central region and the other holding nose has a projection which engages into the recess so that in the closed state of the clip lateral fixing of the two U-limbs relative to each other is guaranteed.

For easier handling in terms of opening and closing the clip an upwardly directed lever arm can be provided at the upper end of the second U-limb, wherein the lever arm can be comfortably actuated by hand to facilitate opening and closing of the snap connection.

If receiving pockets are provided at the outside walls of the channel clips then a downwardly directed holding limb can be provided at the outside of the first U-limb, which holding limb can be hung in the upper edge of the respective receiving pocket.

To ensure that the clip is held in a stable condition to such a receiving pocket an elastically deformable lip can be provided at the inside of the holding limb, the lip bearing against the outside of the receiving pocket when the clip is fitted on with a certain prestressing.

If the holding clip according to the invention is to be fixed to guide channels with smooth outside walls then the top side of the transverse web provided on the first U-limb can have a projection which is provided with a through bore and through which for example a screw is inserted upon mounting of the clip, which screw is either screwed into a threaded bore in the guide channel or however is fitted through a bore provided in the guide channel and is secured by a nut from the inside of the guide channel.

In a further embodiment of the channel clip according to the invention projecting holding bars which face in the direction of the lines to be laid can be arranged at at least one side of the first U-limb, the holding bars having thickened portions at their end remote from the U-limb. The lines to be laid can be additionally fixed to those holding bars by means of cable ties.

The channel clips according to the invention are desirably made in the form of a one-piece plastic injection molding.

BRIEF DESCRIPTION OF THE DRAWINGS

The invention is illustrated by way of example in the drawing and is described in detail hereinafter with reference to the drawing in which.

DETAILED DESCRIPTION

Referring to FIGS. 1 through 4 the channel clip according to the invention comprises a U-shaped bracket 1 made of elastic plastic material and having a first U-limb 2 and a second U-limb 3. The two U-limbs 2 and 3 face upwardly and form a receiving region 4 for the lines which are to be held but which are not shown in the drawing.

Provided at the upper end of the first U-limb 2 is a transverse web 5 which is formed approximately at a right angle on the first U-limb and extends in the direction of the upper end of the second U-limb 3.

To close the receiving region 4 provided at the free end of the transverse web 5 and the adjoining upper end of the second U-limb 3 is a latchable snap connection 6 comprising two holding noses 7 and 8 which engage over each other and elastically latch one behind the other, wherein the one holding nose 7 is arranged on the transverse web 5 and the other holding nose 8 is arranged on an inwardly bent upper region of the second U-limb 3.

The holding nose 7 on the transverse web 5 is directed upwardly and the holding nose 8 on the second U-limb 3 faces downwardly and latches over the holding nose 7 provided on the transverse web 5.

The channel clip according to the invention is preferably produced in the form of a plastic injection molding. In that respect manufacture in the embodiment shown in FIGS. 1 through 4 is effected in such a way that the two U-limbs 2 and 3 are arranged parallel. In that case the second U-limb 3 has to be bent open to open the clip and to insert or remove the lines. To close the snap connection 6 the second U-limb 3 springs back again into the starting position, in which case the snap connection 6 automatically comes into latching engagement or can be closed with a light pressure.

The embodiment shown in FIGS. 1 through 4 of the channel clip is intended for a guide channel (not shown in the drawing) which has receiving pockets at its vertical outside. For fixing the channel clip to such a receiving pocket there is provided at the upper end of the outside region of the first U-limb 2 a downwardly directed holding limb 9 which can be fitted on to the upper edge of a receiving pocket of the guide channel.

To improve the fit on the edge of such a receiving pocket provided at the inside of the holding limb 9 is an elastic lip 10 which when the channel clip is fitted on to the edge of the holding pocket is elastically deformed and thereby produces a contact pressing pressure and thus an improved holding effect.

To facilitate opening and closing of the snap connection 6 provided at the upper end of the second U-limb 3 is an upwardly directed holding arm 11 which can be easily actuated by hand.

The U-shaped bracket 1 shown in FIGS. 1 through 4 is in the shape of a wide strip or band so that it enjoys sufficient stability to securely hold the inserted lines.

The snap connection 6 with its noses 7 and 8 extends in that case over the entire width of the band so that the snap connection 6 has a relatively wide clamping region.

FIGS. 5 through 8 show a further embodiment of the channel clip according to the invention. It has the same parts as in the embodiment shown in FIGS. 1 through 4 so that the same reference numerals have been used for identical parts.

The essential difference in relation to the first embodiment is that the second U-limb 3 towards its upper end is directed away from the first U-limb 2 and has to be bent elastically in the direction of the transverse web 5 until the snap connection 6 comes into latching engagement to close the clip.

Figure 1:
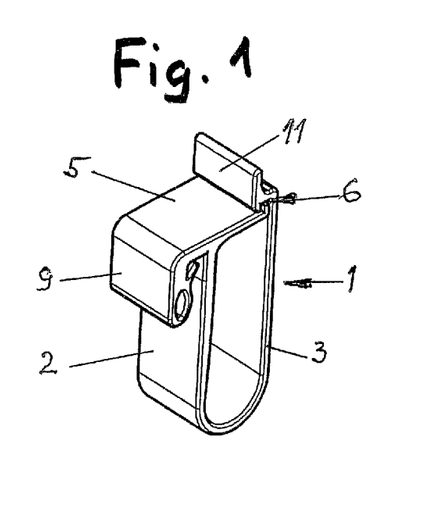
FIG. 1 shows a perspective view of a first embodiment of the channel clip according to the invention.
Figure 2:
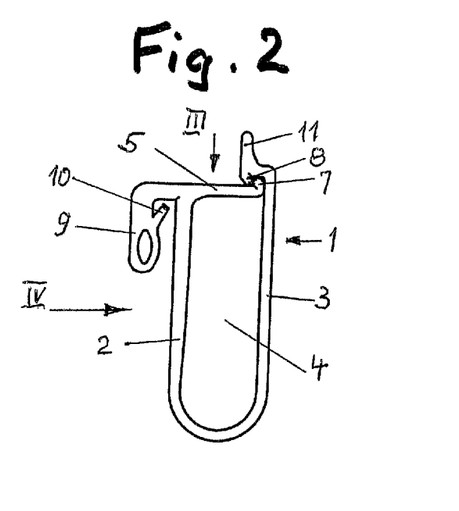
FIG. 2 shows a side view of the channel clip of FIG. 1.
Figure 3:
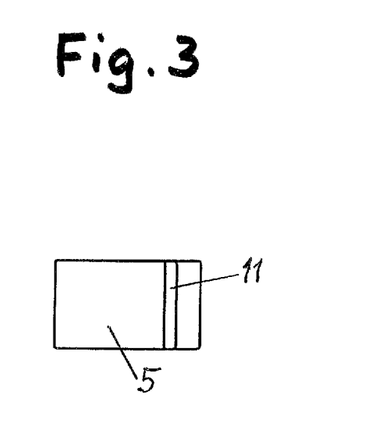
FIG. 3 shows a plan view of the channel clip in the direction of the arrow III in FIG. 2.
Figure 4:
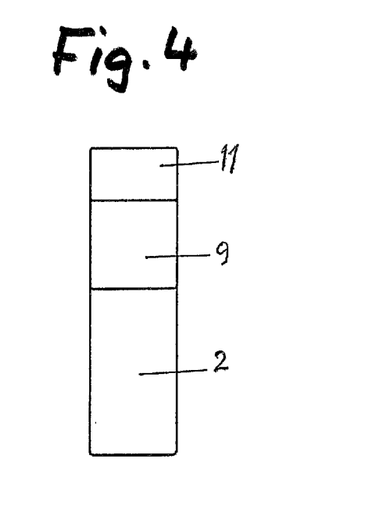
FIG. 4 shows a view in the direction of the arrow IV in FIG. 2.
Figure 5:
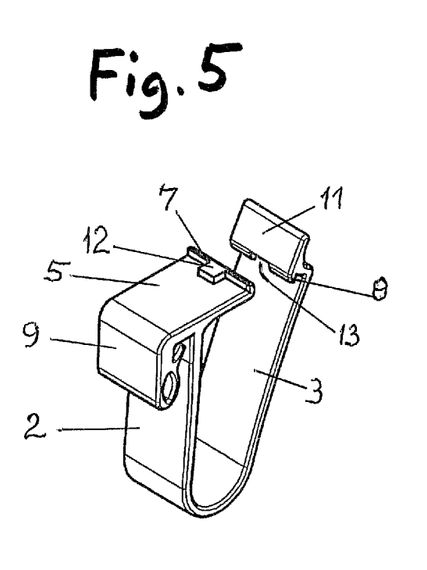
FIG. 5 shows a perspective view of a second embodiment of the channel clip according to the invention.
Figure 6:
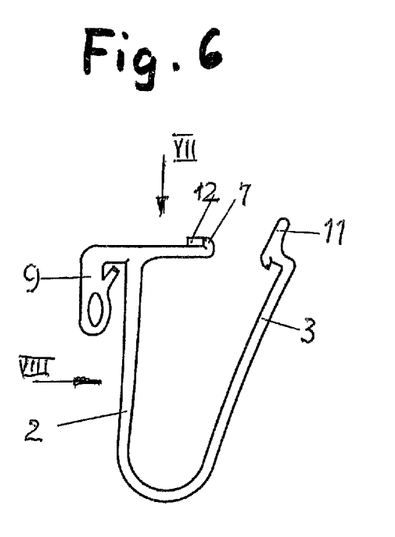
FIG. 6 shows a side view of the channel clip of FIG. 5.

Upon opening of the snap connection the second U-limb 3 springs back into the starting position shown in FIGS. 5 and 6.

In this embodiment the holding nose 7 on the transverse web 5 has a projection 12 in its central region. The holding nose 8 on the second U-limb 3 is provided in its central region with a recess 13 which is approximately as wide as the projection 12 on the holding nose 7. When the snap connection 6 is in latching engagement the projection 12 engages precisely into the recess 13 so that the snap connection is secured to prevent lateral displacement.

It will be appreciated that that function of securing to prevent lateral displacement can also be implemented in the embodiment shown in FIGS. 1 through 4.

Figure 9:
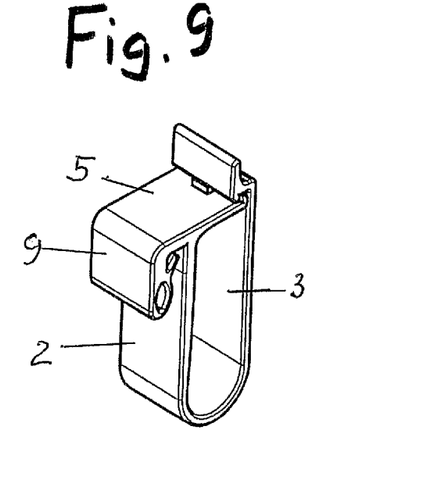
FIG. 9 shows a perspective view of a further embodiment of the channel clip according to the invention.
Figure 10:
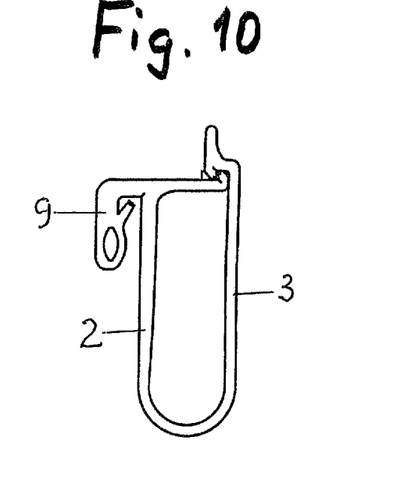
FIG. 10 shows a side view of the embodiment of FIG. 9.

FIGS. 9 and 10 show a further similar embodiment in which the identical parts are again denoted by the same reference numerals as in the preceding embodiments.

The sole difference in relation to the embodiment shown in FIGS. 5 through 8 is that the U-limbs 2 and 3 of the U-shaped bracket 1 are formed approximately parallel in manufacture. To open the clip therefore the second U-limb 3 has to be bent open. After insertion of the lines into the receiving region 4 the second U-limb 3 springs back into its starting position again, in which the snap connection closes.

Figure 7:
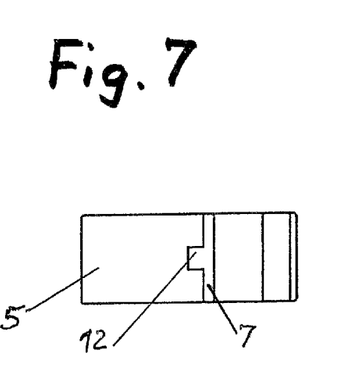
FIG. 7 shows a view of the channel clip of FIG. 6 in the direction of the arrow VII.
Figure 8:
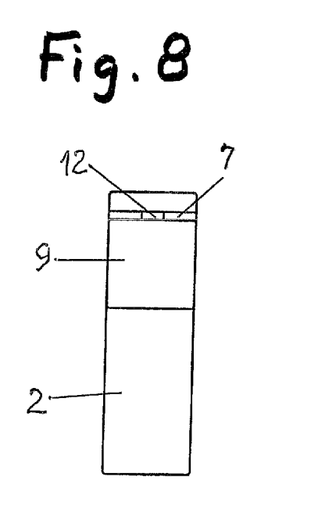
FIG. 8 shows a plan view of the channel clip of FIG. 6 in the direction of the arrow VIII.

In this embodiment also the lateral securing action shown in FIGS. 5 through 7 in the form of the recess 13 and the projection 12 engaging thereinto can also be provided.

Figure 11:
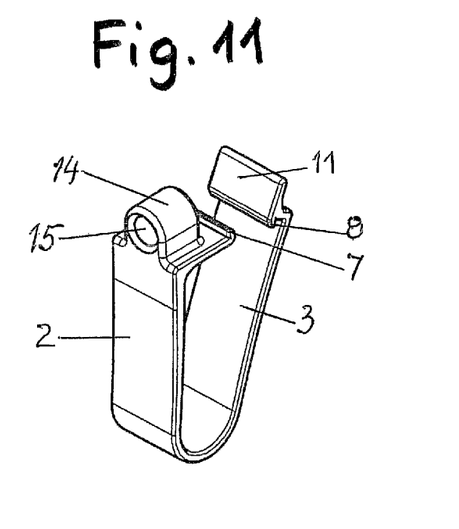
FIG. 11 shows a perspective view of a further embodiment of the channel clip according to the invention.

FIG. 11 shows an embodiment of the channel clip according to the invention, which is mounted to a guide channel having a smooth vertical outside wall. For that purpose provided at the top side of the transverse web 5 on the first U-limb 2 is a raised portion 14 having a through bore 15. The through bore 15 extends precisely perpendicularly to the first U-limb 2 so that, for mounting the channel clip, the outside surface of the first U-limb 2 is placed against the smooth vertical outside wall of the guide channel and fixed in that position. Fixing is effected for example by means of a screw (not shown) in the wall which engages through the through bore 15 and either is screwed into a threaded bore in the guide channel or is secured by a nut which is screwed on to the screw from the inside of the guide channel.

In the embodiment shown in FIG. 11 the second U-limb 3 towards its upper end is directed away from the first U-limb 2 so that, to close the clip, the limb has to be pressed elastically in the direction of the transverse web 5 until the snap connection comes into latching engagement.

Figure 12:
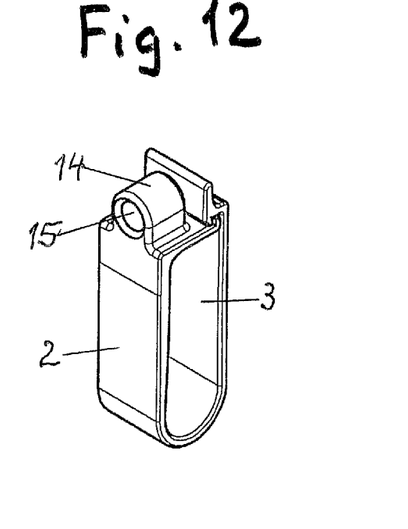
FIG. 12 shows a further embodiment of the channel clip.
Figure 13:
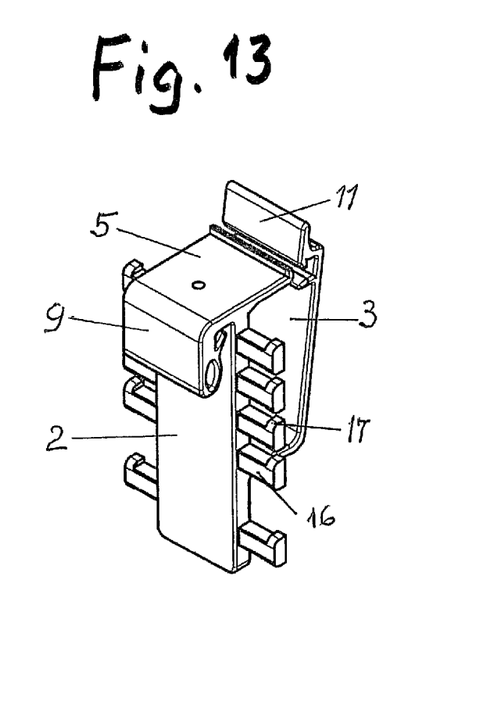
FIG. 13 shows a perspective view of a further embodiment of the channel clip according to the invention.
Figure 14:
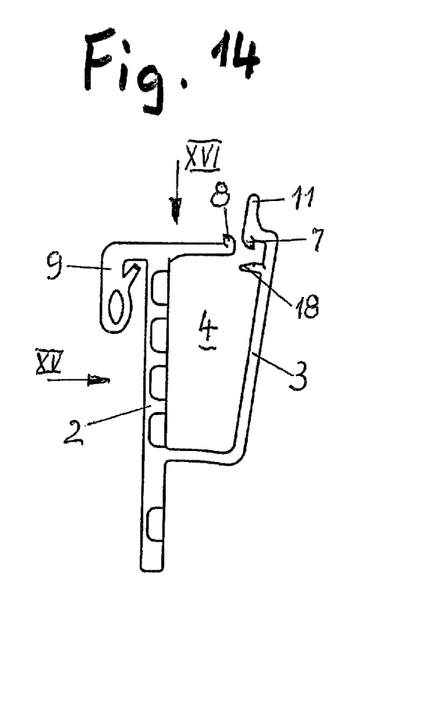
FIG. 14 shows a side view of the channel clip of FIG. 13.
Figure 15:
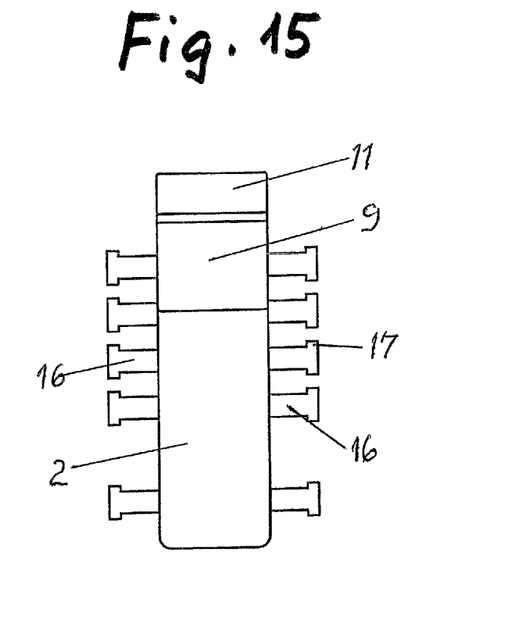
FIG. 15 shows a view of the channel clip of FIG. 14 in the direction of the arrow XV.
Figure 16:
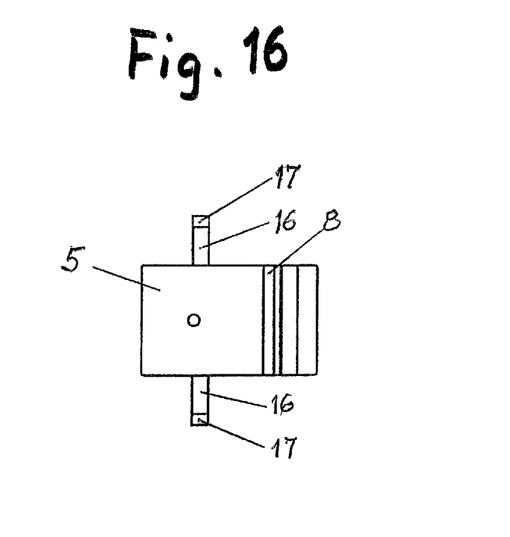
FIG. 16 shows a plan view of the channel clip of FIG. 14 in the direction of the arrow XVI.

The embodiment shown in FIG. 12 corresponds to the embodiment of FIG. 11 with the exception that the two U-limbs 2 and 3 are arranged in approximately parallel relationship so that the second U-limb 3 has to be bent open to open the snap connection. To close the receiving region 4 the second U-limb 3 automatically pivots back into its starting position again so that the snap connection 6 automatically closes or is closed with a slight pressure on the lever arm 11.

The embodiment shown in FIGS. 13 through 16 corresponds in its essential functions to the above-described embodiments.

It will be noted however that this embodiment provides at both sides of the first U-limb 2 projecting holding bars 16 which face towards the laid lines and which have thickened portions 17 at their end remote from the U-limb 2. Those holding bars 16 serve to additionally fix the lines to be laid by means of cable ties. In that case the task of the thickened portions 17 is to hold the cable ties in their position so that they cannot slip down laterally.

A further difference in relation to the above-described embodiments is that the first U-limb 2 is prolonged a distance downwardly.

An additional feature provides that disposed beneath the holding nose 8 provided on the second U-limb 3 is a lip 18 which facilitates latching engagement of the snap connection and additionally secures the snap connection against unintentional opening. It will be appreciated that such a holding nose 18 can also be implemented in the other embodiments to achieve the same effect.

Figure 17:
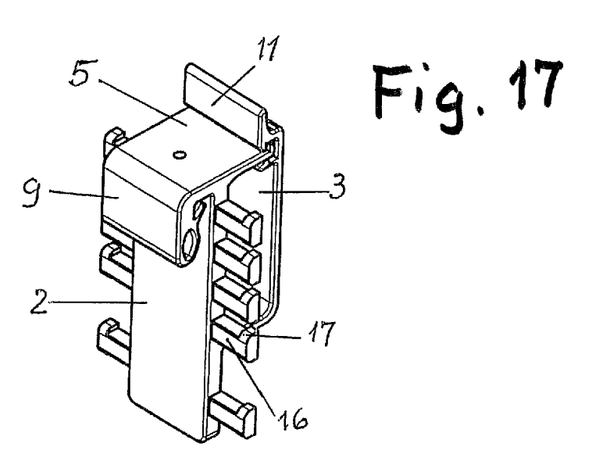
FIG. 17 shows the perspective view of a further embodiment of the channel clip according to the invention.
Figure 18:
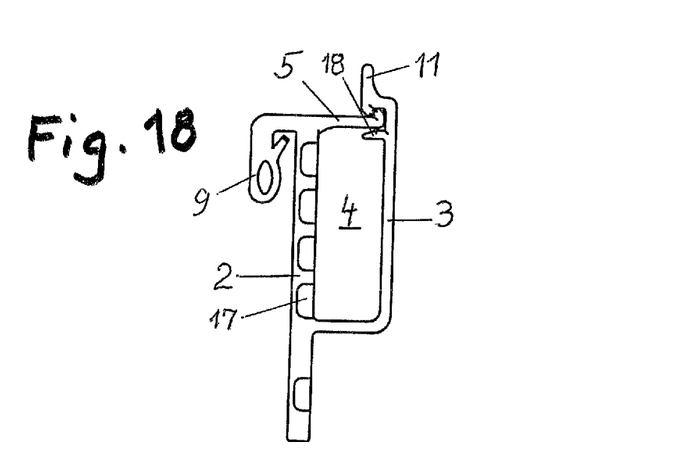
FIG. 18 shows the side view of the channel clip of FIG. 17.

FIGS. 17 and 18 show a similar embodiment to FIGS. 13 through 16, wherein a difference is that the two U-limbs 2 and 3 are arranged in mutually parallel relationship so that, to open the snap connection 6, the second U-limb 3 has to be bent towards the right in the drawing.

The present invention thus provides a very simple and appropriate holding element which can be easily handled and with which lines can be fixed without problem and securely to the outside walls of the guide channels of energy guide chains.

LIST OF REFERENCES

1 U-shaped bracket
2 first U-limb
3 second U-limb
4 receiving region
5 transverse web
6 snap connection
7 holding nose
8 holding nose
9 holding limb
10 elastic lip
11 lever arm
12 projection
13 recess
14 raised portion
15 through bore
16 holding bars
17 thickened portions
18 lip

What is claimed is:

1. A channel clip to hold at least one line externally to a guide channel of an energy guide chain, the channel clip comprising:
 a U-shaped bracket formed of plastic material,
 the U-shaped bracket having a first U-limb and a second U-limb, the first U-limb and the second U-limb forming a receiving region for the at least one line,
 a transverse web disposed at an upper end of the first U-limb, the transverse web extending in a direction towards an upper end of the second U-limb,
 a latchable snap connection to close the receiving region disposed at a free end of the transverse web and at an adjoining upper end of the second U-limb,
 the first U-limb has a device to hold the channel clip to a guide channel,
 the snap connection has two holding noses which engage over each other and which are elastically latchable one behind the other, and
 the transverse web has an inner face which faces the receiving region and an outer face which faces opposite the inner face, and the snap connection is latchable on the outer face of the transverse web.

2. The channel clip as set forth in claim 1, wherein one of the two holding noses is on the transverse web and another one of the two holding noses is on the second U-limb, and
 the holding nose on the transverse web is directed upwardly and the holding nose on the second U-limb faces downwardly and latches over the holding nose on the transverse web.

3. The channel clip as set forth in claim 2, wherein a lip is disposed beneath the holding nose on the second U-limb which, upon latching engagement of the snap connection, grips under the transverse web.

4. The channel clip as set forth in claim 1, wherein one of the two holding noses has a recess and another one of the two holding noses has a projection which engages into the recess.

5. The channel clip as set forth in claim 4, wherein the recess and the projection are each disposed in a central region of each holding nose, respectively.

6. A channel clip to hold at least one line externally to a guide channel of an energy guide chain, the channel clip comprising:
 a U-shaped bracket formed of plastic material,
 the U-shaped bracket having a first U-limb and a second U-limb, the first U-limb and the second U-limb forming a receiving region for the at least one line,
 a transverse web disposed at an upper end of the first U-limb, the transverse web extending in a direction towards an upper end of the second U-limb,
 a latchable snap connection to close the receiving region disposed at a free end of the transverse web and at an adjoining upper end of the second U-limb,
 the first U-limb has a device to hold the channel clip to a guide channel, and
 a downwardly directed holding limb is disposed at an upper end of an outside region of the first U-limb.

7. The channel clip as set forth in claim 6, wherein the snap connection has two holding noses which engage over each other.

8. The channel clip as set forth in claim 7, wherein the two holding noses are elastically latchable one behind the other.

9. The channel clip as set forth in claim 7, wherein one of the two holding noses is on the transverse web and another one of the two holding noses is on the second U-limb, and
 the holding nose on the transverse web is directed upwardly and the holding nose on the second U-limb faces downwardly and latches over the holding nose on the transverse web.

10. The channel clip as set forth in claim 9, wherein a lip is disposed beneath the holding nose on the second U-limb which, upon latching engagement of the snap connection, grips under the transverse web.

11. The channel clip as set forth in claim 7, wherein one of the two holding noses has a recess and another one of the two holding noses has a projection which engages into the recess.

12. The channel clip as set forth in claim 6, wherein the first U-limb and the second U-limb are arranged parallel and the second U-limb has to be elastically bent to open the channel clip to insert the at least one line into the receiving region or remove the at least one line from the receiving region.

13. The channel clip as set forth in claim 6, wherein the second U-limb towards its upper end is directed away from the first U-limb and, to close the channel clip, the second U-limb has to be elastically bent in a direction of the transverse web until the snap connection latches.

14. The channel clip as set forth in claim 6, wherein an upwardly directed lever arm is disposed at the upper end of the second U-limb to facilitate opening and closing of the snap connection.

15. The channel clip as set forth in claim 6, wherein an elastic lip is provided at an inside of the holding limb.

16. The channel clip as set forth in claim 6, wherein at least one projecting holding bar is disposed at least one side of the first U-limb, wherein the at least one projecting holding bar faces in a direction of the at least one line and has a thickened portions at terminal ends.

17. A channel clip to hold at least one line externally to a guide channel of an energy guide chain, the channel clip comprising:
 a U-shaped bracket formed of plastic material,
 the U-shaped bracket having a first U-limb and a second U-limb, the first U-limb and the second U-limb forming a receiving region for the at least one line,
 a transverse web disposed at an upper end of the first U-limb, the transverse web extending in a direction towards an upper end of the second U-limb,
 a latchable snap connection to close the receiving region disposed at a free end of the transverse web and at an adjoining upper end of the second U-limb,
 the first U-limb has a device to hold the channel clip to a guide channel, and
 a raised portion having a through opening is disposed at a top side of the transverse web.

18. The channel clip as set forth in claim 17, wherein the snap connection has two holding noses which engage over each other.

19. The channel clip as set forth in claim 18, wherein the two holding noses are elastically latchable one behind the other.

20. The channel clip as set forth in claim 18, wherein one of the two holding noses is on the transverse web and another one of the two holding noses is on the second U-limb, and
 the holding nose on the transverse web is directed upwardly and the holding nose on the second U-limb faces downwardly and latches over the holding nose on the transverse web.

21. The channel clip as set forth in claim 17, wherein the first U-limb and the second U-limb are arranged parallel and the second U-limb has to be elastically bent to open the channel clip to insert the at least one line into the receiving region or remove the at least one line from the receiving region.

22. The channel clip as set forth in claim 17, wherein the second U-limb towards its upper end is directed away from the first U-limb and, to close the channel clip, the second U-limb has to be elastically bent in a direction of the transverse web until the snap connection latches.

23. The channel clip as set forth in claim 17, wherein an upwardly directed lever arm is disposed at the upper end of the second U-limb to facilitate opening and closing of the snap connection.

* * * * *